No. 610,190. Patented Sept. 6, 1898.
G. J. MILLER.
SECONDARY BATTERY.
(Application filed Apr. 13, 1897.)
(No Model.)
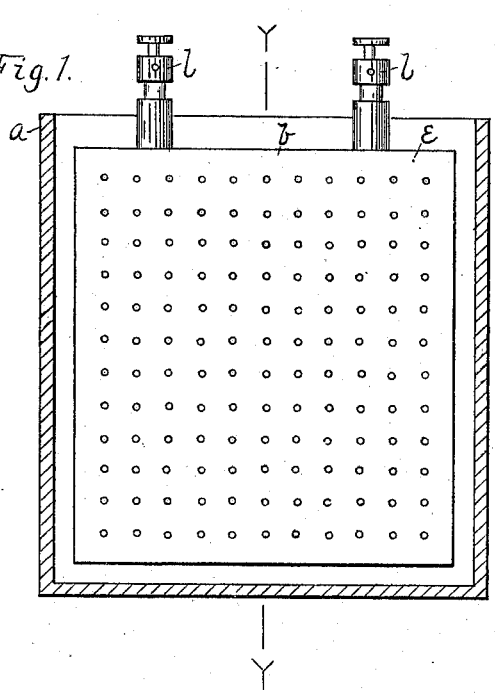
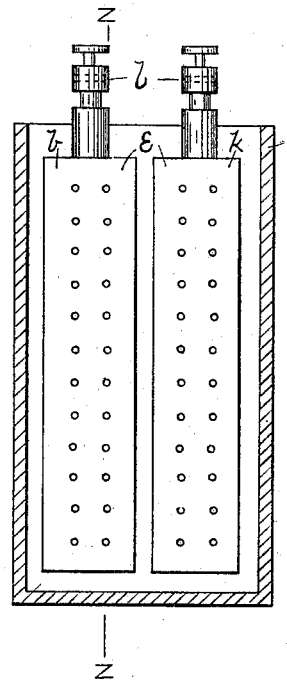
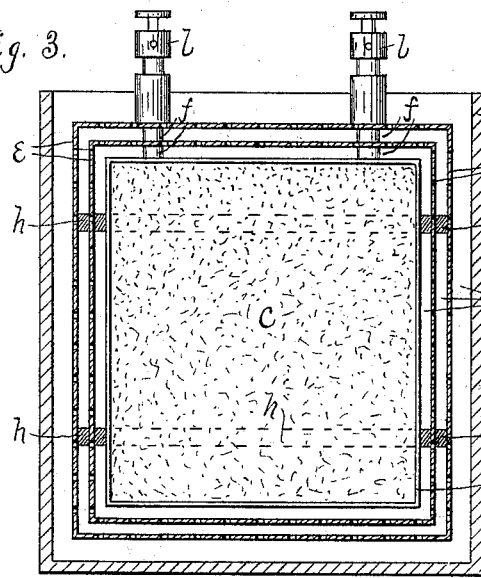
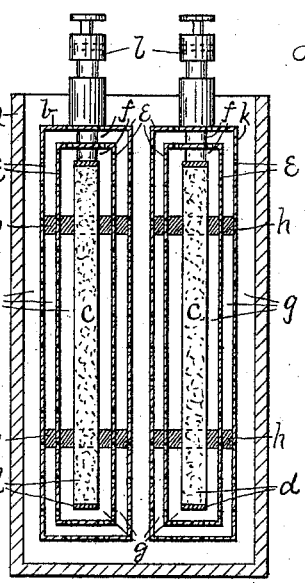
Witnesses
F. B. Mosher.
Paul Strong.
By Attorney
Inventor
George J. Miller.
C. D. Hudgens

UNITED STATES PATENT OFFICE.

GEORGE J. MILLER, OF KENTON, OHIO.

SECONDARY BATTERY.

SPECIFICATION forming part of Letters Patent No. 610,190, dated September 6, 1898.

Application filed April 13, 1897. Serial No. 631,917. (No model.)

*To all whom it may concern:*

Be it known that I, GEORGE J. MILLER, a citizen of the United States, residing at Kenton, in the county of Hardin and State of Ohio, have invented a new and useful Improvement in Secondary Batteries, of which the following is a specification.

The object of my invention is to provide an improved type of secondary batteries in which by the use of perforated metallic-lead cases surrounding and forming a part of the cells, with spaces between the lead cases and the active elements, greater surface is provided for the storage of electrical energy.

My device is illustrated in the accompanying drawings, in which—

Figure 1 is a side view, and Fig. 2 an end view, of two of a series of electrodes. Fig. 3 is a sectional view on the line Z Z, and Fig. 4 a section on the line Y Y.

Similar letters refer to similar parts throughout the several views.

The box $a$ is of the common type, made of hard rubber or other non-conducting material, for containing the electrolytic solution in which the electrodes are submerged. The positive electrode $b$ is composed of peroxid of lead or other active material, forming a cake $c$, surrounded by the metallic-lead band $d$ and mounted in the perforated metallic-lead case $e$ by means of the metallic-lead studs $f$, leaving a space $g$ between the sides and edges of the peroxid cake and the perforated metallic-lead case $e$.

Bars $h$ are placed across each side of the cake $c$ to prevent the sides of the perforated metallic-lead case $e$ from being pressed into contact therewith.

The negative electrode $k$ is constructed in the same manner, with the metallic-lead band or frame $d$ filled with litharge or other active material. Both positive and negative electrodes $b$ and $k$ may be surrounded by one or more of the perforated metallic-lead cases $e$, separated from each other by a space $g$ the same as that between said case and the cakes $c$ and each connected with the other by metallic-lead studs $f$.

Connected to each electrode $b$ and $k$ is a binding-post $l$, in conductive contact with the cake $c$ and the perforated metallic-lead cases $e$.

In my construction of secondary battery a discharge by short-circuiting is practically prevented by the perforated case $e$ preventing any of the disintegrated pieces of the active elements within from being carried by the electrolytic solution to the opposing element or by said disintegrated pieces of the elements drifting into contact with each other at the bottom of the box $a$, as would be the case but for the case $e$ retaining them.

A further and most important improvement in my battery is the increased surface provided for chemical action and the storage of electrical energy.

In batteries of the general type the only surfaces provided for chemical action and the storage of electrical energy are the direct surfaces of the active elements, peroxid and monoxid of lead or other active material producing the necessary chemical reaction.

In the improvements in the battery herein described the exterior perforated metallic-lead cases $e$ permit of the free circulation and action of the electrolytic solution about the active elements of the positive and negative electrodes, and being separated from the active elements and from each other where several are used by the spaces $g$ more surface is provided for chemical action and storage of electrical energy. In the conventional type of batteries only the two opposing sides and edges of the active material of each positive and negative electrode are provided for chemical action and the storage of electrical energy, whereas in my construction the inner and outer surfaces of each metallic-lead case $e$ furnish additional surface and therefore proportionally increased capacity for the storage of energy. It is therefore obvious that by a very small relative increase in the size and weight of each electrode in the addition of each successive surrounding perforated metallic-lead case $e$ the surface in each electrode thus provided for the storage of electrical energy is greatly increased, thus making the cost and weight of a battery per ampere-hour of capacity much less than in the conventional type of battery, an improvement which for all purposes and particularly for some uses is of great advantage and importance.

As herein described and as illustrated in the accompanying drawings, I claim as my invention and pray for protection by Letters Patent—

1. In a secondary battery the combination of an insulating-box, positive and negative electrodes within said box composed of active materials mounted within and in conductive connection to a perforated metallic-lead case, a surrounding space between said active material and the surrounding case except where attached, means for preserving said space, and means for connecting conducting feed and discharge wires substantially as shown and specified.

2. In a secondary battery the combination of an insulating-box for containing an electrolytic solution, positive and negative electrodes submerged therein, said electrodes being composed of active materials and a series of metallic-lead cases surrounding said active materials spaces between said active materials and the innermost case and between each case of each series of cases, means for conductively connecting the active material and cases to each other, openings through said cases for the circulation of the electrolytic fluid and means for connecting conducting feed and discharge wires substantially as shown and specified.

3. In a secondary battery the combination of an insulating-box, and within said box positive and negative electrodes composed of active materials, a series of cases surrounding the active materials, spaces between the active material and the innermost case of the series and between each case of the series, conductive connections between the active material and each case of each series, bars between the active material and the innermost case and between each case of the series for preserving the spaces, openings through the surrounding cases for the circulation of the electrolytic solution and means for connecting conducting feed and discharge wires substantially as shown and specified.

4. In a secondary battery the combination of positive electrodes composed of peroxid-of-lead cakes mounted in metallic-lead frames, a series of perforated metallic-lead cases surrounding said cakes, a surrounding space between said cakes and the innermost case and between each case, negative electrodes composed of litharge cakes mounted in metallic-lead frames, a series of perforated metallic-lead cases surrounding said cakes, a surrounding space between said cakes and the innermost case and between each case, and means for connecting conductors to the electrodes substantially as shown and specified.

5. In a secondary battery the combination of active materials in the positive and negative electrodes, a series of cases surrounding the active material of each positive and negative electrode, a surrounding space between the active material and the innermost case of each electrode, and between each case of each series of cases, openings in said cases for the circulation of the electrolytic solution, means for connecting conducting-wires to the electrodes and a box for containing the electrolytic solution and the electrodes forming the battery substantially as shown and specified.

GEORGE J. MILLER.

Witnesses:
THOMAS B. BLACK,
C. W. FAULKNER.